US009792361B1

(12) United States Patent
Geer (10) Patent No.: US 9,792,361 B1
(45) Date of Patent: Oct. 17, 2017

(54) PHOTOGRAPHIC MEMORY

(71) Applicant: James L. Geer, Hoover, AL (US)

(72) Inventor: James L. Geer, Hoover, AL (US)

(*) Notice: Subject to any disclaimer, the term of this patent is extended or adjusted under 35 U.S.C. 154(b) by 736 days.

(21) Appl. No.: 13/900,495

(22) Filed: May 22, 2013

Related U.S. Application Data

(62) Division of application No. 12/181,956, filed on Jul. 29, 2008, now Pat. No. 8,775,454.

(51) Int. Cl.
*G06F 7/00* (2006.01)
*G06F 17/30* (2006.01)
*G10L 15/26* (2006.01)

(52) U.S. Cl.
CPC .. *G06F 17/30758* (2013.01); *G06F 17/30386* (2013.01); *G10L 15/26* (2013.01)

(58) Field of Classification Search
CPC ........... G06F 17/30067; G06F 17/3074; G06F 17/30283; G06F 17/30755
See application file for complete search history.

(56) References Cited

U.S. PATENT DOCUMENTS

| | | | |
|---|---|---|---|
| 5,875,108 A | 2/1999 | Hoffberg et al. | |
| 5,991,751 A * | 11/1999 | Rivette | G06F 17/30716 |
| 6,081,750 A | 6/2000 | Hoffberg et al. | |
| 6,339,767 B1 * | 1/2002 | Rivette | G06F 17/30011 |
| | | | 707/781 |
| 6,400,996 B1 | 6/2002 | Hoffberg et al. | |
| 6,418,424 B1 * | 7/2002 | Hoffberg | G06F 3/00 |
| | | | 386/E5.004 |
| 6,475,753 B1 * | 11/2002 | Ruben | G01N 33/6893 |
| | | | 435/252.3 |
| 6,499,026 B1 | 12/2002 | Rivette et al. | |
| 6,640,145 B2 | 10/2003 | Hoffberg et al. | |
| 6,661,884 B2 | 12/2003 | Shaffer et al. | |
| 6,850,252 B1 | 2/2005 | Hoffberg | |
| 6,948,066 B2 | 9/2005 | Hind et al. | |
| 6,968,453 B2 | 11/2005 | Doyle et al. | |
| 6,990,444 B2 | 1/2006 | Hind et al. | |
| 6,992,626 B2 | 1/2006 | Smith | |
| 7,006,881 B1 | 2/2006 | Hoffberg et al. | |
| 7,028,184 B2 | 4/2006 | Hind et al. | |
| 7,106,843 B1 | 9/2006 | Gainsboro et al. | |
| 7,127,261 B2 | 10/2006 | Van Erlach | |
| 7,136,710 B1 | 11/2006 | Hoffberg et al. | |
| 7,142,645 B2 * | 11/2006 | Lowe | G06F 17/30017 |
| | | | 379/68 |
| 7,167,553 B2 * | 1/2007 | Shaffer | H04M 3/4228 |
| | | | 379/219 |
| 7,189,507 B2 * | 3/2007 | Mack | C07K 14/47 |
| | | | 435/320.1 |
| 7,234,117 B2 | 6/2007 | Zaner et al. | |

(Continued)

*Primary Examiner* — Daniel Kuddus
(74) *Attorney, Agent, or Firm* — Steven M. Hoffberg, Esq.; Ostrolenk Faber LLP (57) ABSTRACT

A system and method for interacting with a social network database. A user's spoken request is transcribed and associated with metadata comprising location data and sent through a communication port of a mobile electronic device to a social network database. The social network database, in response to the communication, produces a response dependent on the transcribed information and metadata, which is returned to the mobile electronic device, and presented to the user. An ad may be included in the presentation to the user.

18 Claims, 6 Drawing Sheets

(56) References Cited

U.S. PATENT DOCUMENTS

| | | | |
|---|---|---|---|
| 7,305,381 B1* | 12/2007 | Poppink et al. | |
| 7,353,396 B2 | 4/2008 | Micali et al. | |
| 7,370,112 B2 | 5/2008 | Saito et al. | |
| 7,433,327 B2 | 10/2008 | Harville et al. | |
| 7,451,005 B2 | 11/2008 | Hoffberg et al. | |
| 7,505,907 B2 | 3/2009 | Carro | |
| 7,519,588 B2 | 4/2009 | Mason | |
| 7,523,126 B2 | 4/2009 | Rivette et al. | |
| 7,546,334 B2 | 6/2009 | Redlich et al. | |
| 7,602,782 B2 | 10/2009 | Doviak et al. | |
| 7,606,580 B2 | 10/2009 | Granito et al. | |
| 7,610,011 B2 | 10/2009 | Albrett | |
| 7,645,212 B2 | 1/2010 | Ashby et al. | |
| 7,657,749 B2 | 2/2010 | Saito et al. | |
| 7,669,051 B2 | 2/2010 | Redlich et al. | |
| 7,689,922 B2 | 3/2010 | Zaner et al. | |
| 7,711,733 B2 | 5/2010 | Weaver | |
| 7,716,008 B2 | 5/2010 | Ohta | |
| 7,716,232 B2 | 5/2010 | Glenn | |
| 7,720,037 B2 | 5/2010 | Bill | |
| 7,747,956 B2 | 6/2010 | Zaner et al. | |
| 7,765,265 B1 | 7/2010 | Granito et al. | |
| 7,774,155 B2 | 8/2010 | Sato et al. | |
| 7,813,822 B1 | 10/2010 | Hoffberg | |
| 7,849,475 B2 | 12/2010 | Covell et al. | |
| 7,857,731 B2 | 12/2010 | Hickman et al. | |
| 7,865,367 B2 | 1/2011 | Carro | |
| 7,889,847 B2 | 2/2011 | Gainsboro | |
| 7,890,123 B2 | 2/2011 | Granito et al. | |
| 7,895,524 B2 | 2/2011 | Zaner et al. | |
| 7,904,187 B2 | 3/2011 | Hoffberg et al. | |
| 7,929,958 B2 | 4/2011 | Van Erlach | |
| 7,931,902 B2 | 4/2011 | de Sauvage et al. | |
| 7,949,728 B2 | 5/2011 | Rivette et al. | |
| 7,957,725 B2 | 6/2011 | Van Erlach | |
| 7,966,078 B2 | 6/2011 | Hoffberg et al. | |
| 7,974,714 B2 | 7/2011 | Hoffberg | |
| 7,984,145 B2 | 7/2011 | Persinger | |
| 7,987,003 B2 | 7/2011 | Hoffberg et al. | |
| 7,987,490 B2* | 7/2011 | Ansari | G06Q 30/04 725/105 |
| 8,000,454 B1 | 8/2011 | Or-Bach et al. | |
| 8,015,183 B2 | 9/2011 | Frank | |
| 8,031,060 B2 | 10/2011 | Hoffberg et al. | |
| 8,054,952 B1 | 11/2011 | Or-Bach et al. | |
| 8,085,924 B2 | 12/2011 | Shaffer et al. | |
| 8,121,618 B2 | 2/2012 | Rhoads et al. | |
| 8,122,468 B2 | 2/2012 | Begeja et al. | |
| 8,135,801 B2 | 3/2012 | Harper et al. | |
| 8,149,112 B2 | 4/2012 | Schlager et al. | |
| 8,150,845 B2 | 4/2012 | Weaver | |
| 8,155,280 B1 | 4/2012 | Or-Bach et al. | |
| 8,156,001 B1 | 4/2012 | Jing et al. | |
| 8,160,215 B2 | 4/2012 | Or-Bach et al. | |
| 8,165,916 B2 | 4/2012 | Hoffberg et al. | |
| 8,176,515 B2 | 5/2012 | Ahmad et al. | |
| 8,176,563 B2 | 5/2012 | Redlich et al. | |
| 8,185,448 B1 | 5/2012 | Myslinski | |
| 8,223,931 B1 | 7/2012 | Lavian et al. | |
| 8,229,458 B2 | 7/2012 | Busch | |
| 8,229,795 B1 | 7/2012 | Myslinski | |
| 8,238,526 B1 | 8/2012 | Seth et al. | |
| 8,265,610 B1 | 9/2012 | Delker et al. | |
| 8,290,425 B2 | 10/2012 | Albrett | |
| 8,290,506 B1 | 10/2012 | Coverstone | |
| 8,306,810 B2 | 11/2012 | Li | |
| 8,315,423 B1 | 11/2012 | Jing et al. | |
| 8,321,295 B1 | 11/2012 | Myslinski | |
| 8,341,665 B2 | 12/2012 | Atsmon et al. | |
| 8,345,835 B1 | 1/2013 | Or-Bach et al. | |
| 8,346,604 B2 | 1/2013 | Jing et al. | |
| 8,360,873 B1 | 1/2013 | Wickett et al. | |
| 8,364,136 B2 | 1/2013 | Hoffberg et al. | |
| 8,364,171 B2 | 1/2013 | Busch | |
| 8,369,967 B2 | 2/2013 | Hoffberg et al. | |
| 8,374,866 B2 | 2/2013 | Weinstein et al. | |
| 8,385,588 B2 | 2/2013 | Jacoby et al. | |
| 8,401,529 B1 | 3/2013 | Delker et al. | |
| 8,401,902 B1 | 3/2013 | Stone et al. | |
| 8,401,919 B2 | 3/2013 | Myslinski | |
| 8,406,388 B2 | 3/2013 | Or-Bach et al. | |
| 8,422,994 B2 | 4/2013 | Rhoads et al. | |
| 8,423,424 B2 | 4/2013 | Myslinski | |
| 8,428,227 B2 | 4/2013 | Angel et al. | |
| 8,429,630 B2 | 4/2013 | Nickolov et al. | |
| 8,433,611 B2 | 4/2013 | Lax et al. | |
| 8,437,771 B1 | 5/2013 | Coverstone | |
| 8,437,776 B2 | 5/2013 | Busch | |
| 8,447,331 B2 | 5/2013 | Busch | |
| 8,447,608 B1 | 5/2013 | Chang et al. | |
| 8,457,771 B2 | 6/2013 | Kim et al. | |
| 8,458,046 B2 | 6/2013 | Myslinski | |
| 8,462,745 B2 | 6/2013 | Alizadeh-Shabdiz | |
| 8,468,244 B2 | 6/2013 | Redlich et al. | |
| 8,473,350 B1 | 6/2013 | Bouret et al. | |
| 8,478,297 B2 | 7/2013 | Morgan et al. | |
| 8,484,192 B1 | 7/2013 | Sahami et al. | |
| 8,494,953 B1 | 7/2013 | Boberski | |
| 8,499,030 B1 | 7/2013 | Reisman | |
| 8,510,173 B2 | 8/2013 | Myslinski | |
| 8,515,459 B2 | 8/2013 | Busch | |
| 8,516,266 B2 | 8/2013 | Hoffberg et al. | |
| 8,520,002 B2 | 8/2013 | Stambaugh | |
| 8,533,761 B1 | 9/2013 | Sahami et al. | |
| 8,538,457 B2 | 9/2013 | Morgan et al. | |
| 8,539,359 B2 | 9/2013 | Rapaport et al. | |
| 8,545,330 B2 | 10/2013 | Wickett et al. | |
| 8,547,943 B2 | 10/2013 | Bill | |
| 8,553,859 B1 | 10/2013 | Lavian et al. | |
| 8,554,640 B1 | 10/2013 | Dykstra et al. | |
| 8,559,977 B2 | 10/2013 | Busch | |
| 8,560,484 B2 | 10/2013 | Lyons et al. | |
| 8,566,236 B2 | 10/2013 | Busch | |
| 8,572,649 B1 | 10/2013 | Gossweiler, III et al. | |
| 8,574,840 B2 | 11/2013 | Kotseroglou | |
| 8,577,000 B1 | 11/2013 | Brown | |
| 8,583,263 B2 | 11/2013 | Hoffberg et al. | |
| 8,583,509 B1 | 11/2013 | Myslinski | |
| 8,584,158 B2 | 11/2013 | Covell et al. | |
| 8,612,211 B1 | 12/2013 | Shires et al. | |
| 8,612,310 B2 | 12/2013 | Yates | |
| 8,620,769 B2 | 12/2013 | Yates | |
| 8,621,012 B2 | 12/2013 | Jackson et al. | |
| 8,625,756 B1 | 1/2014 | Lavian et al. | |
| 8,626,194 B2 | 1/2014 | Busch | |
| 8,629,836 B2 | 1/2014 | Liberty | |
| 8,630,664 B2 | 1/2014 | Alizadeh-Shabdiz et al. | |
| 8,631,440 B2 | 1/2014 | Gossweiler, III et al. | |
| 8,635,272 B2 | 1/2014 | Reisman | |
| 8,638,256 B2 | 1/2014 | Alizadeh-Shabdiz et al. | |
| 8,638,725 B2 | 1/2014 | Alizadeh-Shabdiz | |
| 8,638,908 B2 | 1/2014 | Leeds et al. | |
| 8,645,991 B2 | 2/2014 | McIntire et al. | |
| 8,655,939 B2 | 2/2014 | Redlich et al. | |
| 8,660,246 B1 | 2/2014 | Brown | |
| 8,660,247 B1 | 2/2014 | Brown | |
| 8,660,355 B2 | 2/2014 | Rodriguez et al. | |
| 8,661,464 B2 | 2/2014 | Arankalle et al. | |
| 8,676,937 B2 | 3/2014 | Rapaport et al. | |
| 8,676,992 B2 | 3/2014 | Bonalle et al. | |
| 8,681,951 B1 | 3/2014 | Lavian et al. | |
| 8,687,777 B1 | 4/2014 | Lavian et al. | |
| 8,700,396 B1 | 4/2014 | Mengibar et al. | |
| 8,712,431 B2 | 4/2014 | Granito et al. | |
| 8,713,584 B2 | 4/2014 | Harm et al. | |
| 8,718,837 B2 | 5/2014 | Wang et al. | |
| 8,719,339 B2 | 5/2014 | Reisman | |
| 8,719,354 B2 | 5/2014 | Granito et al. | |
| 8,731,148 B1 | 5/2014 | Lavian et al. | |
| 8,732,091 B1 | 5/2014 | Abhyanker | |
| 8,738,103 B2 | 5/2014 | Puente Baliarda et al. | |
| 8,738,545 B2 | 5/2014 | Abhyanker | |
| 8,742,929 B2 | 6/2014 | Sawyer | |
| 8,768,379 B2 | 7/2014 | Busch | |

(56) References Cited

U.S. PATENT DOCUMENTS

| | | |
|---|---|---|
| 8,768,782 B1 | 7/2014 | Myslinski |
| 2001/0010994 A1* | 8/2001 | Nelson .................. G09F 19/02 446/490 |
| 2002/0049738 A1* | 4/2002 | Epstein ............................ 707/1 |
| 2002/0055924 A1* | 5/2002 | Liming ................ G01S 5/0027 |
| 2002/0069056 A1* | 6/2002 | Nofsinger ............... G10L 15/26 704/235 |
| 2002/0069057 A1* | 6/2002 | Kapust et al. ................. 704/235 |
| 2002/0095296 A1 | 7/2002 | Hind et al. |
| 2002/0095586 A1 | 7/2002 | Doyle et al. |
| 2002/0095587 A1 | 7/2002 | Doyle et al. |
| 2002/0095601 A1 | 7/2002 | Hind et al. |
| 2002/0151992 A1 | 10/2002 | Hoffberg et al. |
| 2002/0164004 A1 | 11/2002 | Tamura et al. |
| 2002/0174436 A1 | 11/2002 | Wu et al. |
| 2003/0033161 A1 | 2/2003 | Walker et al. |
| 2003/0033294 A1 | 2/2003 | Walker et al. |
| 2003/0046401 A1 | 3/2003 | Abbott et al. |
| 2003/0159044 A1 | 8/2003 | Doyle et al. |
| 2003/0212893 A1 | 11/2003 | Hind et al. |
| 2004/0041836 A1 | 3/2004 | Zaner et al. |
| 2004/0158634 A1 | 8/2004 | Saito et al. |
| 2004/0204063 A1 | 10/2004 | Van Erlach |
| 2005/0078172 A1 | 4/2005 | Harville et al. |
| 2005/0132070 A1 | 6/2005 | Redlich et al. |
| 2005/0138109 A1 | 6/2005 | Redlich et al. |
| 2005/0138110 A1 | 6/2005 | Redlich et al. |
| 2005/0160141 A1 | 7/2005 | Galley et al. |
| 2005/0185918 A1 | 8/2005 | Lowe |
| 2005/0192727 A1* | 9/2005 | Shostak et al. .................. 701/37 |
| 2006/0003323 A1 | 1/2006 | Alsobrook et al. |
| 2006/0062363 A1 | 3/2006 | Albrett |
| 2006/0123053 A1 | 6/2006 | Scannell, Jr. |
| 2006/0155398 A1 | 7/2006 | Hoffberg et al. |
| 2006/0190827 A1 | 8/2006 | Zaner et al. |
| 2006/0190828 A1 | 8/2006 | Zaner et al. |
| 2006/0190829 A1 | 8/2006 | Zaner et al. |
| 2006/0200253 A1 | 9/2006 | Hoffberg et al. |
| 2006/0200258 A1 | 9/2006 | Hoffberg et al. |
| 2006/0200259 A1 | 9/2006 | Hoffberg et al. |
| 2006/0200260 A1 | 9/2006 | Hoffberg et al. |
| 2006/0206324 A1* | 9/2006 | Skilling et al. ............... 704/231 |
| 2006/0258397 A1 | 11/2006 | Kaplan et al. |
| 2006/0287890 A1* | 12/2006 | Stead et al. ........................ 705/3 |
| 2006/0287988 A1 | 12/2006 | Mason |
| 2007/0016476 A1 | 1/2007 | Hoffberg et al. |
| 2007/0028264 A1 | 2/2007 | Lowe |
| 2007/0041545 A1 | 2/2007 | Gainsboro |
| 2007/0053513 A1 | 3/2007 | Hoffberg |
| 2007/0099176 A1 | 5/2007 | Boden et al. |
| 2007/0155402 A1 | 7/2007 | Van Erlach |
| 2007/0157228 A1* | 7/2007 | Bayer et al. ...................... 725/34 |
| 2007/0198432 A1 | 8/2007 | Pitroda et al. |
| 2007/0198951 A1 | 8/2007 | Frank |
| 2007/0204187 A1 | 8/2007 | DeMarco et al. |
| 2007/0219968 A1 | 9/2007 | Frank |
| 2007/0239531 A1 | 10/2007 | Beaufays et al. |
| 2007/0239883 A1 | 10/2007 | Glenn |
| 2007/0250901 A1 | 10/2007 | McIntire et al. |
| 2007/0282623 A1 | 12/2007 | Dattorro |
| 2008/0004056 A1* | 1/2008 | Suzman ........................ 455/466 |
| 2008/0010262 A1 | 1/2008 | Frank |
| 2008/0010273 A1 | 1/2008 | Frank |
| 2008/0010605 A1 | 1/2008 | Frank |
| 2008/0031203 A1 | 2/2008 | Bill |
| 2008/0033935 A1 | 2/2008 | Frank |
| 2008/0033936 A1 | 2/2008 | Frank |
| 2008/0033944 A1 | 2/2008 | Frank |
| 2008/0040336 A1 | 2/2008 | Frank |
| 2008/0052638 A1 | 2/2008 | Frank et al. |
| 2008/0056538 A1 | 3/2008 | Frank |
| 2008/0059452 A1 | 3/2008 | Frank |
| 2008/0065685 A1 | 3/2008 | Frank |
| 2008/0104531 A1 | 5/2008 | Stambaugh |
| 2008/0104532 A1 | 5/2008 | Stambaugh |
| 2008/0109756 A1 | 5/2008 | Stambaugh |
| 2008/0109757 A1 | 5/2008 | Stambaugh |
| 2008/0109758 A1 | 5/2008 | Stambaugh |
| 2008/0109759 A1 | 5/2008 | Stambaugh |
| 2008/0109760 A1 | 5/2008 | Stambaugh |
| 2008/0109761 A1 | 5/2008 | Stambaugh |
| 2008/0111818 A1 | 5/2008 | Stambaugh |
| 2008/0129725 A1 | 6/2008 | Stambaugh |
| 2008/0150963 A1 | 6/2008 | Stambaugh |
| 2008/0168135 A1 | 7/2008 | Redlich et al. |
| 2008/0168272 A1 | 7/2008 | Saito et al. |
| 2008/0172632 A1 | 7/2008 | Stambaugh |
| 2008/0189329 A1 | 8/2008 | Weaver |
| 2008/0201227 A1 | 8/2008 | Bakewell et al. |
| 2008/0222687 A1 | 9/2008 | Edry |
| 2008/0270449 A1 | 10/2008 | Gossweiler et al. |
| 2008/0271072 A1 | 10/2008 | Rothschild et al. |
| 2008/0276266 A1 | 11/2008 | Huchital et al. |
| 2008/0320522 A1 | 12/2008 | Jones |
| 2009/0006191 A1 | 1/2009 | Arankalle et al. |
| 2009/0006375 A1 | 1/2009 | Lax et al. |
| 2009/0019061 A1 | 1/2009 | Scannell, Jr. |
| 2009/0030778 A1* | 1/2009 | Zapata et al. .................... 705/10 |
| 2009/0076917 A1 | 3/2009 | Jablokov et al. |
| 2009/0132813 A1 | 5/2009 | Schibuk |
| 2009/0150147 A1 | 6/2009 | Jacoby et al. |
| 2009/0150947 A1 | 6/2009 | Soderstrom |
| 2009/0171668 A1 | 7/2009 | Sneyders et al. |
| 2009/0177644 A1* | 7/2009 | Martinez ........... G06F 17/30864 |
| 2009/0178144 A1 | 7/2009 | Redlich et al. |
| 2009/0193075 A1 | 7/2009 | Persinger |
| 2009/0205000 A1 | 8/2009 | Christensen et al. |
| 2009/0220093 A1 | 9/2009 | Hodges et al. |
| 2009/0222432 A1 | 9/2009 | Ratnakar |
| 2009/0254572 A1 | 10/2009 | Redlich et al. |
| 2009/0265163 A1 | 10/2009 | Li et al. |
| 2009/0276771 A1 | 11/2009 | Nickolov et al. |
| 2009/0300528 A1 | 12/2009 | Stambaugh |
| 2010/0010968 A1 | 1/2010 | Redlich et al. |
| 2010/0015584 A1 | 1/2010 | Singer et al. |
| 2010/0023463 A1 | 1/2010 | Walker et al. |
| 2010/0030578 A1 | 2/2010 | Siddique et al. |
| 2010/0030738 A1* | 2/2010 | Geer ................................ 707/3 |
| 2010/0063880 A1 | 3/2010 | Atsmon et al. |
| 2010/0076642 A1 | 3/2010 | Hoffberg et al. |
| 2010/0086107 A1 | 4/2010 | Tzruya |
| 2010/0105315 A1 | 4/2010 | Albrett |
| 2010/0118200 A1 | 5/2010 | Gelman et al. |
| 2010/0122285 A1 | 5/2010 | Begeja et al. |
| 2010/0185613 A1 | 7/2010 | Weaver |
| 2010/0205541 A1 | 8/2010 | Rapaport et al. |
| 2010/0226284 A1 | 9/2010 | Bill |
| 2010/0229105 A1 | 9/2010 | Zaner et al. |
| 2010/0250497 A1 | 9/2010 | Redlich et al. |
| 2010/0297985 A1 | 11/2010 | Van Erlach |
| 2010/0311393 A1 | 12/2010 | Castleman |
| 2010/0312813 A1 | 12/2010 | Castleman |
| 2010/0313244 A1 | 12/2010 | Castleman |
| 2010/0313249 A1 | 12/2010 | Castleman |
| 2011/0040824 A1 | 2/2011 | Harm |
| 2011/0041140 A1 | 2/2011 | Harm et al. |
| 2011/0041141 A1 | 2/2011 | Harm et al. |
| 2011/0043652 A1 | 2/2011 | King et al. |
| 2011/0055309 A1 | 3/2011 | Gibor et al. |
| 2011/0067055 A1 | 3/2011 | Karaoguz et al. |
| 2011/0093460 A1* | 4/2011 | Lunt ................ G06F 17/30864 707/727 |
| 2011/0093640 A1* | 4/2011 | Hui ...................... G06F 13/385 710/310 |
| 2011/0098056 A1 | 4/2011 | Rhoads et al. |
| 2011/0136477 A1 | 6/2011 | Van Erlach |
| 2011/0145001 A1 | 6/2011 | Kim et al. |
| 2011/0156896 A1 | 6/2011 | Hoffberg et al. |
| 2011/0161076 A1 | 6/2011 | Davis et al. |
| 2011/0167110 A1 | 7/2011 | Hoffberg et al. |
| 2011/0179180 A1 | 7/2011 | Schleifer et al. |
| 2011/0191221 A1 | 8/2011 | Kubert et al. |
| 2011/0196933 A1 | 8/2011 | Jackson et al. |
| 2011/0214050 A1 | 9/2011 | Stambaugh |

(56) References Cited

U.S. PATENT DOCUMENTS

| | | |
|---|---|---|
| 2011/0225048 A1 | 9/2011 | Nair |
| 2011/0244919 A1 | 10/2011 | Aller et al. |
| 2011/0246490 A1 | 10/2011 | Jonsson |
| 2011/0286584 A1 | 11/2011 | Angel et al. |
| 2011/0287748 A1 | 11/2011 | Angel et al. |
| 2011/0307241 A1 | 12/2011 | Waibel et al. |
| 2011/0321127 A1 | 12/2011 | Pitroda et al. |
| 2012/0005077 A1 | 1/2012 | Pitroda et al. |
| 2012/0005078 A1 | 1/2012 | Pitroda et al. |
| 2012/0005079 A1 | 1/2012 | Pitroda et al. |
| 2012/0005080 A1 | 1/2012 | Pitroda et al. |
| 2012/0005081 A1 | 1/2012 | Pitroda et al. |
| 2012/0005082 A1 | 1/2012 | Pitroda et al. |
| 2012/0005083 A1 | 1/2012 | Pitroda et al. |
| 2012/0005084 A1 | 1/2012 | Pitroda et al. |
| 2012/0005085 A1 | 1/2012 | Pitroda et al. |
| 2012/0005086 A1 | 1/2012 | Pitroda et al. |
| 2012/0005087 A1 | 1/2012 | Pitroda et al. |
| 2012/0005088 A1 | 1/2012 | Pitroda et al. |
| 2012/0005089 A1 | 1/2012 | Pitroda et al. |
| 2012/0005090 A1 | 1/2012 | Pitroda et al. |
| 2012/0005091 A1 | 1/2012 | Pitroda et al. |
| 2012/0005092 A1 | 1/2012 | Pitroda et al. |
| 2012/0005725 A1 | 1/2012 | Pitroda et al. |
| 2012/0005726 A1 | 1/2012 | Pitroda et al. |
| 2012/0011058 A1 | 1/2012 | Pitroda et al. |
| 2012/0036016 A1 | 2/2012 | Hoffberg et al. |
| 2012/0063574 A1 | 3/2012 | Or-Bach et al. |
| 2012/0069131 A1 | 3/2012 | Abelow |
| 2012/0075338 A1 | 3/2012 | Curtis et al. |
| 2012/0075490 A1 | 3/2012 | Tsai et al. |
| 2012/0078626 A1 | 3/2012 | Tsai et al. |
| 2012/0078691 A1 | 3/2012 | Tsai et al. |
| 2012/0078712 A1 | 3/2012 | Fontana et al. |
| 2012/0078899 A1 | 3/2012 | Fontana et al. |
| 2012/0079380 A1 | 3/2012 | Tsai et al. |
| 2012/0101831 A1 | 4/2012 | Pitroda et al. |
| 2012/0101832 A1 | 4/2012 | Pitroda et al. |
| 2012/0101833 A1 | 4/2012 | Pitroda et al. |
| 2012/0101834 A1 | 4/2012 | Pitroda et al. |
| 2012/0101835 A1 | 4/2012 | Pitroda et al. |
| 2012/0101836 A1 | 4/2012 | Pitroda et al. |
| 2012/0109667 A1 | 5/2012 | Pitroda et al. |
| 2012/0109668 A1 | 5/2012 | Pitroda et al. |
| 2012/0109669 A1 | 5/2012 | Pitroda et al. |
| 2012/0109670 A1 | 5/2012 | Pitroda et al. |
| 2012/0109671 A1 | 5/2012 | Pitroda et al. |
| 2012/0109672 A1 | 5/2012 | Pitroda et al. |
| 2012/0109673 A1 | 5/2012 | Pitroda et al. |
| 2012/0109674 A1 | 5/2012 | Pitroda et al. |
| 2012/0116790 A1 | 5/2012 | Pitroda et al. |
| 2012/0116959 A1 | 5/2012 | Pitroda et al. |
| 2012/0134480 A1 | 5/2012 | Leeds et al. |
| 2012/0158390 A1 | 6/2012 | Lyons et al. |
| 2012/0159536 A1 | 6/2012 | Treacy et al. |
| 2012/0165046 A1 | 6/2012 | Rhoads et al. |
| 2012/0166293 A1 | 6/2012 | Jing et al. |
| 2012/0226646 A1 | 9/2012 | Donoho et al. |
| 2012/0245936 A1 | 9/2012 | Treglia |
| 2012/0278061 A1 | 11/2012 | Weinstein et al. |
| 2012/0278177 A1 | 11/2012 | Bender et al. |
| 2012/0284623 A1 | 11/2012 | Soderstrom |
| 2012/0290950 A1 | 11/2012 | Rapaport et al. |
| 2012/0303445 A1 | 11/2012 | Jablokov et al. |
| 2012/0309368 A1 | 12/2012 | Van Erlach |
| 2012/0317046 A1 | 12/2012 | Myslinski |
| 2012/0317593 A1 | 12/2012 | Myslinski |
| 2012/0323954 A1 | 12/2012 | Bonalle et al. |
| 2012/0324378 A1 | 12/2012 | Stambaugh |
| 2013/0022181 A1 | 1/2013 | Or-Bach et al. |
| 2013/0022183 A1 | 1/2013 | Or-Bach et al. |
| 2013/0022189 A1 | 1/2013 | Ganong, III et al. |
| 2013/0022191 A1 | 1/2013 | Or-Bach et al. |
| 2013/0022216 A1 | 1/2013 | Ganong, III et al. |
| 2013/0022551 A1 | 1/2013 | Ruiz-Opazo et al. |
| 2013/0024196 A1 | 1/2013 | Ganong, III et al. |
| 2013/0029760 A1 | 1/2013 | Wickett et al. |
| 2013/0029766 A1 | 1/2013 | Wickett et al. |
| 2013/0031574 A1 | 1/2013 | Myslinski |
| 2013/0036004 A1 | 2/2013 | Bender et al. |
| 2013/0036014 A1 | 2/2013 | Bender et al. |
| 2013/0036015 A1 | 2/2013 | Bender et al. |
| 2013/0046589 A1 | 2/2013 | Grigg et al. |
| 2013/0054367 A1 | 2/2013 | Grigg et al. |
| 2013/0054368 A1 | 2/2013 | Grigg et al. |
| 2013/0054369 A1 | 2/2013 | Grigg et al. |
| 2013/0057691 A1 | 3/2013 | Atsmon et al. |
| 2013/0060757 A1 | 3/2013 | Myslinski |
| 2013/0060860 A1 | 3/2013 | Myslinski |
| 2013/0061055 A1 | 3/2013 | Schibuk |
| 2013/0066730 A1 | 3/2013 | Myslinski |
| 2013/0066750 A1 | 3/2013 | Siddique et al. |
| 2013/0067333 A1 | 3/2013 | Brenneman |
| 2013/0074110 A1 | 3/2013 | Myslinski |
| 2013/0085968 A1 | 4/2013 | Schultz et al. |
| 2013/0093897 A1 | 4/2013 | Fan et al. |
| 2013/0128060 A1 | 5/2013 | Rhoads et al. |
| 2013/0151240 A1 | 6/2013 | Myslinski |
| 2013/0151641 A1 | 6/2013 | Myslinski |
| 2013/0156167 A1 | 6/2013 | Talwar et al. |
| 2013/0157624 A1 | 6/2013 | Talwar et al. |
| 2013/0157626 A1 | 6/2013 | Talwar et al. |
| 2013/0157627 A1 | 6/2013 | Talwar et al. |
| 2013/0157699 A1 | 6/2013 | Talwar et al. |
| 2013/0158984 A1 | 6/2013 | Myslinski |
| 2013/0159127 A1 | 6/2013 | Myslinski |
| 2013/0170393 A1 | 7/2013 | Bill |
| 2013/0170394 A1 | 7/2013 | Bill |
| 2013/0173264 A1 | 7/2013 | Kiss et al. |
| 2013/0173269 A1 | 7/2013 | Adler et al. |
| 2013/0191298 A1 | 7/2013 | Myslinski |
| 2013/0194970 A1 | 8/2013 | Bill |
| 2013/0195095 A1 | 8/2013 | Bill |
| 2013/0198196 A1 | 8/2013 | Myslinski |
| 2013/0208714 A1 | 8/2013 | Bill |
| 2013/0215116 A1 | 8/2013 | Siddique et al. |
| 2013/0238312 A1 | 9/2013 | Waibel |
| 2013/0238338 A1 | 9/2013 | Kharod et al. |
| 2013/0246120 A1 | 9/2013 | Chang et al. |
| 2013/0246124 A1 | 9/2013 | Fischer et al. |
| 2013/0246146 A1 | 9/2013 | Fischer et al. |
| 2013/0246176 A1 | 9/2013 | Chang et al. |
| 2013/0246177 A1 | 9/2013 | Fischer et al. |
| 2013/0246178 A1 | 9/2013 | Fischer et al. |
| 2013/0246187 A1 | 9/2013 | Chau et al. |
| 2013/0246216 A1 | 9/2013 | Chau et al. |
| 2013/0246300 A1 | 9/2013 | Fischer et al. |
| 2013/0254802 A1 | 9/2013 | Lax et al. |
| 2013/0268103 A1 | 10/2013 | Kim et al. |
| 2013/0294648 A1 | 11/2013 | Rhoads et al. |
| 2013/0297310 A1 | 11/2013 | Weinstein et al. |
| 2013/0304761 A1 | 11/2013 | Redlich et al. |
| 2013/0308920 A1 | 11/2013 | Myslinski |
| 2013/0311168 A1 | 11/2013 | Li |
| 2013/0311333 A1 | 11/2013 | Myslinski |
| 2013/0311388 A1 | 11/2013 | Myslinski |
| 2013/0311910 A1 | 11/2013 | Stambaugh |
| 2013/0324161 A1 | 12/2013 | Rhoads et al. |
| 2013/0325597 A1 | 12/2013 | Morgan et al. |
| 2013/0325601 A1 | 12/2013 | Shekhawat et al. |
| 2013/0325625 A1 | 12/2013 | Morgan et al. |
| 2013/0325626 A1 | 12/2013 | Morgan et al. |
| 2013/0325640 A1 | 12/2013 | Morgan et al. |
| 2013/0325875 A1 | 12/2013 | Morgan et al. |
| 2013/0326008 A1 | 12/2013 | Morgan et al. |
| 2013/0326009 A1 | 12/2013 | Morgan et al. |
| 2013/0332170 A1 | 12/2013 | Melamed |
| 2013/0346208 A1 | 12/2013 | Bouret et al. |
| 2014/0007010 A1 | 1/2014 | Blom |
| 2014/0031132 A1 | 1/2014 | Wickett et al. |
| 2014/0039975 A1 | 2/2014 | Hill |
| 2014/0040343 A1 | 2/2014 | Nickolov et al. |
| 2014/0046827 A1 | 2/2014 | Hochstatter et al. |
| 2014/0052623 A1 | 2/2014 | Pitroda et al. |

(56) References Cited

U.S. PATENT DOCUMENTS

| | | |
|---|---|---|
| 2014/0052640 A1 | 2/2014 | Pitroda et al. |
| 2014/0067690 A1 | 3/2014 | Pitroda et al. |
| 2014/0067691 A1 | 3/2014 | Pitroda et al. |
| 2014/0067825 A1 | 3/2014 | Oztaskent et al. |
| 2014/0087780 A1 | 3/2014 | Abhyanker et al. |
| 2014/0089219 A1 | 3/2014 | Mathews |
| 2014/0089241 A1 | 3/2014 | Hoffberg et al. |
| 2014/0089317 A1 | 3/2014 | Ludvigsen et al. |
| 2014/0089435 A1 | 3/2014 | Jackson et al. |
| 2014/0108932 A1 | 4/2014 | Soderstrom |
| 2014/0109141 A1 | 4/2014 | Gossweiler, III et al. |
| 2014/0115671 A1 | 4/2014 | Abhyanker |
| 2014/0119531 A1 | 5/2014 | Tuchman et al. |
| 2014/0123246 A1 | 5/2014 | Abhyanker |
| 2014/0123247 A1 | 5/2014 | Abhyanker |
| 2014/0130140 A1 | 5/2014 | Abhyanker |
| 2014/0136328 A1 | 5/2014 | Abhyanker |
| 2014/0136414 A1 | 5/2014 | Abhyanker |
| 2014/0136624 A1 | 5/2014 | Abhyanker |
| 2014/0143004 A1 | 5/2014 | Abhyanker |
| 2014/0143061 A1 | 5/2014 | Abhyanker |
| 2014/0143800 A1 | 5/2014 | Arankalle et al. |
| 2014/0149244 A1 | 5/2014 | Abhyanker |
| 2014/0149338 A1 | 5/2014 | Bonalle et al. |
| 2014/0160248 A1 | 6/2014 | Pomerantz et al. |
| 2014/0160250 A1 | 6/2014 | Pomerantz et al. |
| 2014/0161250 A1 | 6/2014 | Leeds et al. |
| 2014/0164476 A1 | 6/2014 | Thomson |
| 2014/0164994 A1 | 6/2014 | Myslinski |
| 2014/0173452 A1 | 6/2014 | Hoffberg et al. |
| 2014/0177813 A1 | 6/2014 | Leeds et al. |
| 2014/0180914 A1 | 6/2014 | Abhyanker |

\* cited by examiner

PHOTOGRAPHIC MEMORY

TECHNICAL FIELD OF THE INVENTION

The present invention is directed, in general, to using a phone to record phone calls, meetings and dictation, and for storing the metadata, audio and/or speech recognized text into a centralized content searchable repository, so that all or most of all conversations and near everything seen or read can be searched with a single query, somewhat like the capabilities of a hypothetical person with a "photographic memory".

The default operation for the phone is for this recorded speech and other content is to be labeled private, so only the phone user can access the recorded speech, but the phone user may designate certain of the content to be public, to be shared with anyone via the Internet, in what is known as Location Blogging. This could also be called a community or collective photographic memory, where the content is contributed by multiple members of the community.

BACKGROUND OF THE INVENTION

Many people believe they could be more productive if they could remember everything they have read or seen and all the conversations they have had with others. These are the capabilities of a hypothetical person with a "photographic memory".

If a person converses by email, this person has a searchable record of their conversations. This person can now search using the search features provides by their email software, or the search facilities provided by an outbound program, such as the popular Google Desktop Search or by a document or content management software.

Thus, a person has a proxy for a "photographic memory" for email conversations. All their email conversations are in one place and can be searched on demand, to "remember" any conversation, in a matter of a couple of seconds.

However, many conversations are by phone or in person and these are typically not recorded, and if recorded, are not searchable, and if searchable, are not searchable with the same search that searches email. Therefore, unlike a hypothetical person with a "photographic memory", there is no centralized computerized repository for all conversations and everything seen or read, that can be searched with a single query.

Ideally, a person should be able to record and search, with one query, anything discussed in their phone calls and face-to-face conversations, as well as anything they have seen or read, including emails and text messages.

A salesman should be able to talk with a prospect on his cell phone and the call be recorded. With the present invention, the audio can be automatically sent to a server for speech recognition and then the audio and speech-recognized text and call date, time and calling party names sent to a searchable computer repository.

A professional should be able to use her cell phone as a recording device (without making a call while recording) to record the audio of a meeting and then take a picture of her handwritten notes and the whiteboard. With the present invention, the audio could be automatically sent to a server for speech recognition, and the audio and speech-recognized text sent to a searchable computer repository.

If a mobile phone user sees a traffic jam, or a hazard in the road, such as a stalled vehicle, or a driver driving the wrong way on the Interstate, the mobile phone user should be able to send a spoken message, with speech-recognized text and location data, to a community searchable database, from which others can be instantly warned of the hazard, via text message, voice message, email, warning icon on the GPS map in their car or on their phone, digital signs on the road, etc.

Therefore, what is needed in the art is an easy and unobtrusive way to record and search audio from phone calls and face-to-face conversations, as well as record and search things seen, such as a whiteboard with a schematic of a new product, or an article in a publication. These should be recorded to a centralized computerized database that can be searched with one query.

A Conversation may be defined as a conversation with one or multiple other people, or it can be a person dictating.

SUMMARY

A system for collecting data may include a data collection device to obtain the data from a user, an apparatus for obtaining metadata for each word of the data from the user, an apparatus for obtaining a searchable transcript of the data and a device to store the searchable transcript.

The metadata may be date data, time data, name data or location data and the data collection device may include a speech recognition engine to translate speech into searchable words.

The speech recognition engine may provide a confidence level corresponding to the translation of the speech into searchable words, and the speech recognition engine may distinguish a first user and a second user in order to provide a first searchable transcript for the first user and a second searchable transcript for the second user.

An ad transcript may be added to the searchable transcript, and the searchable transcript may be placed in a centralized community search database.

A method for collecting data may include the steps of obtaining the data from a user, obtaining metadata for each word of the data from the user, obtaining a searchable transcript of the data, and storing the searchable transcript.

The metadata may be date data, time data, name data or location data, the method may include the step of operating a speech recognition engine to translate speech into searchable words.

A confidence level may be provided corresponding to the translation of the speech into searchable words, and the speech recognition engine may distinguish a first user and a second user in order to provide a first searchable transcript for the first user and a second searchable transcript for the second user.

An ad transcript may be added to the searchable transcript, and the method may place the searchable transcript in a centralized community search database.

BRIEF DESCRIPTION OF THE DRAWINGS

The invention may be understood by reference to the following description taken in conjunction with the accompanying drawings, in which, like reference numerals identify like elements, and in which.

DETAILED DESCRIPTION

To address the above-discussed deficiencies of the prior art in providing a "photographic memory", the present invention provides for using a cell phone or other phone to record audio from both phone calls as well as face-to-face Conversations, and provides speech recognition so the Conversations can be searched.

For recording things seen, such as a schematic on a whiteboard, hand-written notes on a notepad, or an article in a publication, a camera phone can be used to take a picture of the whiteboard, notepad, or each page of the article. Also, many camera phones include video, for example at 15-30 pictures (frames) per second (FPS), so a video can be recorded, and the present invention provides for sending them to the same repository as Conversations.

Camera phones may have a 5 megapixel resolution and 30 FPS, and the resolution is expected to continue to increase over these levels.

When a person takes a picture or video, they will be prompted by the phone and asked to provide a brief description of the picture or video, and this description or synopsis may be used to index the picture or video so it can be searched by any word or phrase in the description. The person can speak the description, or type the description on a keyboard.

The phone records the date and time and location (e.g., by GPS) of each Conversation, picture or video recorded, so the Conversations, pictures and video can be searched by date, time and location, as well as the speech-recognized text of the recorded audio or synopsis.

If the camera phone picture or video is sent to the repository while a Conversation is being recorded, the person may not be prompted for a description of the picture or video, and the picture or video is added as an attachment to the record of the Conversation. When a person searches on any word or phrase in the Conversation, they can click to the see attached pictures and videos.

The searchable database can be a person's email system or their customer relationship management software or their document management software, or their enterprise content management software.

Also, newer computer operating systems, such as Windows Vista, may provide search capabilities for files and emails, and there are utility programs, such as Google Desktop search, that provide search capabilities.

The recorded audio and speech-recognized text can also be sent to a specialized "audio search" database, in which there is a link between each text (speech-recognized) word and the elapsed time (byte offset) in the audio where that word can be heard.

For each text word, the elapsed time is stored, so a user can click any text word and hear the audio, starting at the time in the audio when that word was spoken.

For phone calls, the present invention may use speech recognition to generate a transcript of the Conversation and sends the call information and transcript to the phone user's email system or Search Database, where Search Database is defined as a Customer Relationship Management system, Document Management system, Enterprise Content Management system, or "specialized audio search" database, or similar repository for storing and searching the audio, metadata (such as caller name and date of call) and/or speech-recognized text of the audio.

The Search Database typically may include a SQL relational database, for the metadata and audio, video and photos, and an inverted text file, to speed text searching.

The Search Database can be on the users own computer or server, or it could be a hosted service "in the Cloud", available over the Internet, such as that provided by Salesforce.com or Amazon.

For face-to-face meetings, the phone can be used as a dictation device, to record, after the meeting, a synopsis of the meeting (without making an actual call), and the audio will be sent to a server, speech recognized, and then sent to the phone user's email system or Search Database. Alternatively, the user could use their phone to record the entire meeting.

For example, the user could attend a design meeting for a quantum computer, and at the end of the meeting record a synopsis of the meeting and take a picture or video (with their camera phone) of the white board where a schematic was drawn. The user could also take a picture of pages from a technical journal article about quantum computers. All of this information could be sent to their Search Database or email system.

Phone may be defined as a mobile handset, such as a cell phone, computer with VOIP (voice over Internet) phone service, land-line phone or similar telephony device or text message over a phone.

In 2008, Intel announced wireless Internet pocket-size computers, called Mobile Internet Devices, which can be used as a computer, and with VOIP service, as a phone.

In addition to the traditional telephony providers, such as Verizon, land-line phone service and phones are provided by Cable TV providers, such as Time Warner.

These land-line phones may have wired or cordless handsets with a base station, such as the popular 2.4 GHz cordless handsets. The cordless handsets may have a camera for photos and video, and the base station may be in each home (subscriber premises).

The base station on subscriber premises is what differentiates a cordless telephone from a mobile phone. Current cordless telephone standards, such as PHS and DECT, have blurred the once clear-cut line between cordless and mobile telephones by implementing cell handover and other features. In these models, base stations are maintained by a commercial mobile network operator and users subscribe to the service.

For programming mobile phones, Google offers the Android SDK (software development kit), and the first Android phones are scheduled to ship in 2008. In 2008, Apple began to offer an SDK for it's IPhone. Symbian offers an SDK for a wide variety of phones. This programming may be used to implement the teachings of the present invention.

Here's an overview of operation of operation of the present invention.

The user makes or receives a Phone call.

At end of the call, the user is optionally prompted to record a short synopsis of the call, for an "Action List" or main points.

The present invention sends the call data, including the caller and callee name and phone number, date, time, location, and audio of synopsis as well as (optionally) full audio of call to a computer server.

The audio of the phone user is recorded from the microphone which may include a high sampling rate and high-quality compression, and sent via TCP/IP, instead of being sent over a lower-quality voice channel.

The present invention performs speech recognition of the synopsis and full audio and then emails, from the server, this text in the body of the email to the user's email system, with the synopsis audio and full audio as attachments, so the user can search to find calls and read the transcript of the synopsis or full call and listen to recorded audio of the synopsis or full call if they need to.

Or, the call data may be sent, with the above speech-recognized text and audio attachments, to a Search Database, instead of sending it to their email system.

For those wanting the call data sent directly to their email, instead of first to a server, the present invention can send the call info directly from the Phone to their email. Also, the present invention can use the speech recognition provided on the phone to do speech recognition before the email is sent, but this phone-based speech recognition may be of lesser quality than server-based speech recognition.

Call logging in accordance with the teachings of the present invention may also be good for billing of time to clients for CPAs, lawyers, tech support, etc.

For face-to-face meetings, the same approach may be used, except no phone call may be made. The Phone may be used as a recording device, for audio and pictures and video, as discussed in quantum computer example above.

For users desiring an ad-supported service instead of a subscription-based service, the present invention can provide for targeted ads. The present invention can use the speech-recognized text, to target the ad to something (a keyword) mentioned one or more times in the conversation.

Also, the present invention can use the user-provided (or phone company provided) demographics of the Phone user to target the ad, including age, sex, income, job title, interests, etc.

The ad may be added to the recorded audio (synopsis and full call audio) as well as the speech-recognized text. Or, the user could see the ad on their phone or hear the ad before they record their synopsis.

For legal reasons, the default option would be to record only the phone user's side of the call, and not record the other party unless the other party gave their permission. Alternatively, where legal, both sides of the conversation could be recorded.

The voice-recognized call text transcripts may contain a timestamp indicating the time or byte offset within the call audio where each voice recognized-word is found.

The location coordinates can be added to the timestamp in the text transcripts, so the text transcripts have a record of not just where, in the audio file, each word can be found, but where the user was when the user spoke the word.

This location-spoken data can be used, e.g., in the selection of ads to present to the user. If the phone user is discussing a 100 inch Panasonic flat panel TV, the presented ad could be an ad for the electronics store nearest the user, at the time the user mentioned the 100 inch Panasonic TV.

The location-spoken data could also be used in "post action" review for police or first responder actions, military fire fights, or mockups or trials of same, so the reviewer may know not just all the words recorded, but where each phone user was when they spoke each word.

Computer hard disk capacity has been doubling each 18 months for many years, and this is expected to continue for at least the next 10 years. In 2008, an inexpensive 3.5 inch hard disk has a capacity of 1 terabytes. In ten years, an inexpensive hard drive may hold 64 terabytes.

Mobile phone bandwidth is increasing as well. For example, NTT DoCoMo, Inc. has taken 4G mobile broadband standard Long-Term Evolution (LTE) out of the lab and shown 250 Mbit/s for the downlink.

The data sent to the repository can also include data picked up by using the Phone as a sensor, e.g., to record and transmit wireless data from another Phone or an adjacent automobile. This could be useful for a rolling ad-hoc surveillance or vehicles and people.

For example, all new vehicles may be mandated to have a tire pressure monitoring system (TPMS), which periodically sends a wireless signal to the vehicle to which the tires are mounted.

In a typical TPMS, each wheel of the vehicle may contain a device (TPMS sensor), usually attached to the inflation valve, that measures air pressure.

Each sensor transmits this information, usually once per minute, to the on-board computer in the vehicle. To differentiate between its own wheels and wheels of the vehicle in the next lane, each TPMS sensor may contain a unique id, for each vehicle. The majority of TPMS sensors may transmit information in clear text using the assigned radio frequencies 315 MHz or 433 MHz or other appropriate frequency.

The TPMS may be automatically recorded (by a Phone) from passing vehicles, and may be sent to the Search Database. A community of users may share this TPMS data with a central service (such as the government), or a central service may search each user's TPMS data, so the central service may map the locations where all "detected" vehicles were at any time they were detected.

The phone sensor may also detect and record Bluetooth signals from adjacent vehicles or people, or "drive by wireless" signals in vehicles.

Figure 1:
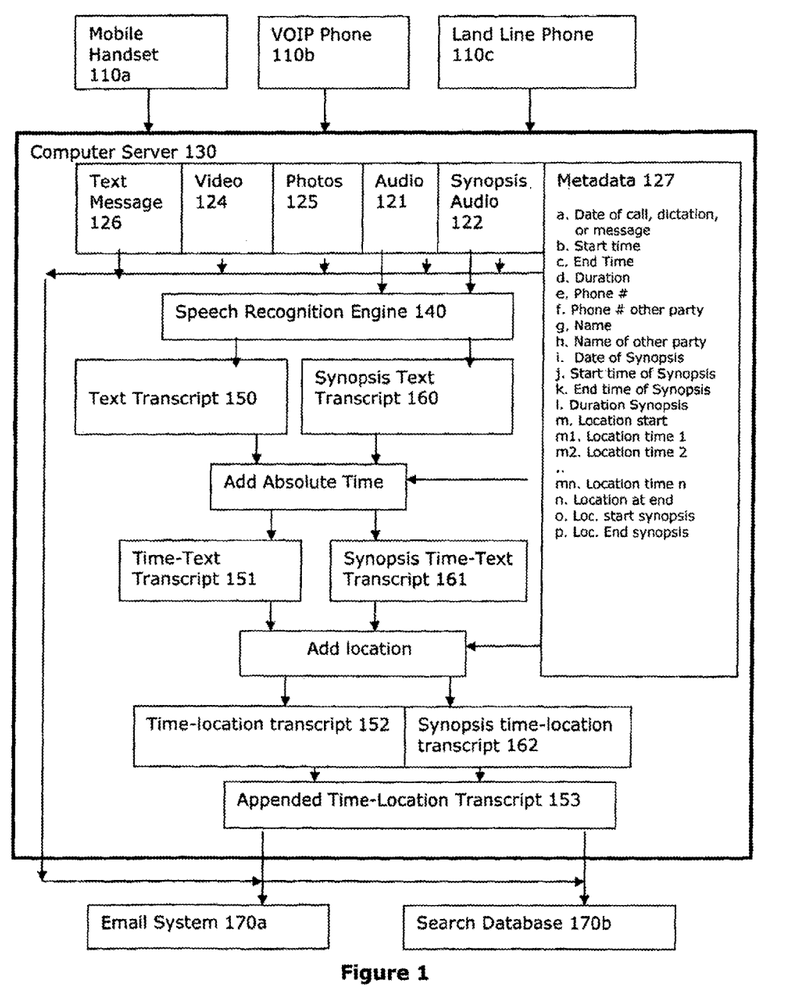
FIG. 1 illustrates a block diagram with a computer server for speech recognition and intermediary processing.

As shown in FIG. 1, the data which may include the audio 121, synopsis audio 122, video 124, photos 125, text messages 126 and metadata 127 recorded on or streamed live and which may have been received from a data collection device including Mobile Handset Phone 110*a*, Voice Over IP (VOIP) Phone 110*b* or land line phone 110C are transmitted via the Internet or intranet, e.g., using TCP/IP for lossless or at least high-quality data transmission, to the computer server 130.

If the event was a phone call, the metadata includes date and time of call, phone number of both parties to the call, names of both parties, and Location of phone user, such as coordinates provided by GPS or cell-phone-tower triangulation.

If the event was not a call, e.g., the data was obtained from a dictation or recording of a meeting, the metadata corresponding with this data may include date and time of recording, phone number of phone user, name of phone user, and location of phone user.

If the data was obtained from a text message, the metadata corresponding to this data may include date and time of message, names and message IDs of both parties, and the Location of phone user.

Once the data is on the computer server 130, the data for example the audio 121 and synopsis audio 122 may be processed by a speech recognition engine 140, such as the Nuance Communications speech recognition engine, if the data was audio 121 a text transcript 150 of the call may be generated or if the data was synopsis audio, dictation audio and text transcript may be generated by the synopsis text transcript 160.

The speech recognition engine may provide time offset within the audio based upon where each word is found. Consequently, the text transcript 150 and synopsis text transcript 160 may contain a timestamp indicating the relative time or byte offset within the audio 121 and synopsis audio 122 where each voice recognized-word is found.

The speech recognition engine can also provide a confidence level for each word, to show the presumed correctness of each speech-recognized word.

The relative time or byte offset may be used to hear the audio of the word while viewing the text of the word. This may be used, e.g., to verify the accuracy of the voice-recognized text.

For applications where the actual time spoken for each word is important, e.g., for video and audio surveillance, the start date and time of the call or dictation may be read from metadata 127.

The start date 127a and start time 127b may be added to the relative timestamp 150a for each word in text transcript 150 to produce time-text transcript 151 with an absolute date/timestamp for each word, so that the user may obtain a text word, a relative time offset, and an absolute date/time for each word.

The synopsis start date 127i and synopsis start time 127j can be added to the relative timestamp 160a for each word in the synopsis text transcript 160 to produce synopsis time-text transcript 161 with an absolute date/timestamp for each word, so that you have a text word, a relative time offset, and an absolute date/time for each word.

The user may configure the present invention to record or send new Location data any time the user's location changes by a certain distance, such as 2 meters.

The location coordinates 127m1, 127m2, ... 127mn read from metadata 127 can be added next to each timestamp in the time-text transcript 151 to produce time-location transcript 152, so the time-location stamps for each word, i.e., a record of where the phone user was when the phone user spoke each word may be generated for the user.

The synopsis location coordinates 127n read from metadata 127 may be added next to each word in the synopsis time-text transcript 161 to produce synopsis time-location transcript 162, so time-location stamps for each word, i.e., a record of where the phone user was when the phone user spoke each word may be generated by the user.

In order to simplify searching, so that there may be only one searchable text document for each call or dictation, the time-location transcript 152 is appended to the end of the synopsis time-location transcript 162 to produce the appended time-location transcript 153.

The call transcript timestamps may have an indicator, such as a flag byte, that can be used to differentiate them from the synopsis timestamps, so when the user views the appended time-location transcript 153 and the user clicks to hear the audio, the correct related audio can be accessed, i.e., either the call audio 121 or synopsis audio 122.

Text Transcript 150 and synopsis transcript 160 may want the plain speech-recognized text first in the transcript, followed by the same speech-recognized text with the relative timestamp next to each word, so users who are viewing the text with their regular email viewer can read the text without seeing the timestamps.

The subsequent stages of adding the absolute time to produce time-text transcript 151 and Synopsis time-text transcript 161, adding the locations to produce Time-location transcript 152 and synopsis time-location transcript 162, would add the actual-time stamp and location-stamp to the time stamped part of the transcripts, i.e., the second copy of the words that have timestamps added next to each word.

Instead of the time stamped part of a transcript being sent at the bottom of the text transcript, it may be sent as an attachment.

For calls and dictation, the appended time-location transcript 153, along with attached call audio 121, attached synopsis audio 122, attached video 124, attached photos 125, and metadata 127 may be transmitted from the computer server 130 via the Internet or intranet, e.g., using TCP/IP for near lossless or at least high-quality data transmission, to the email system 170a or Search Database 170b of the user.

For text messages, the text message 126, along with attached video 124, attached photos 125, and metadata 127 may be transmitted from the computer server 130 via the Internet or intranet, e.g., using TCP/IP for near lossless or at least high-quality data transmission, to the email system 170a or Search Database 170b of the user.

Figure 2:
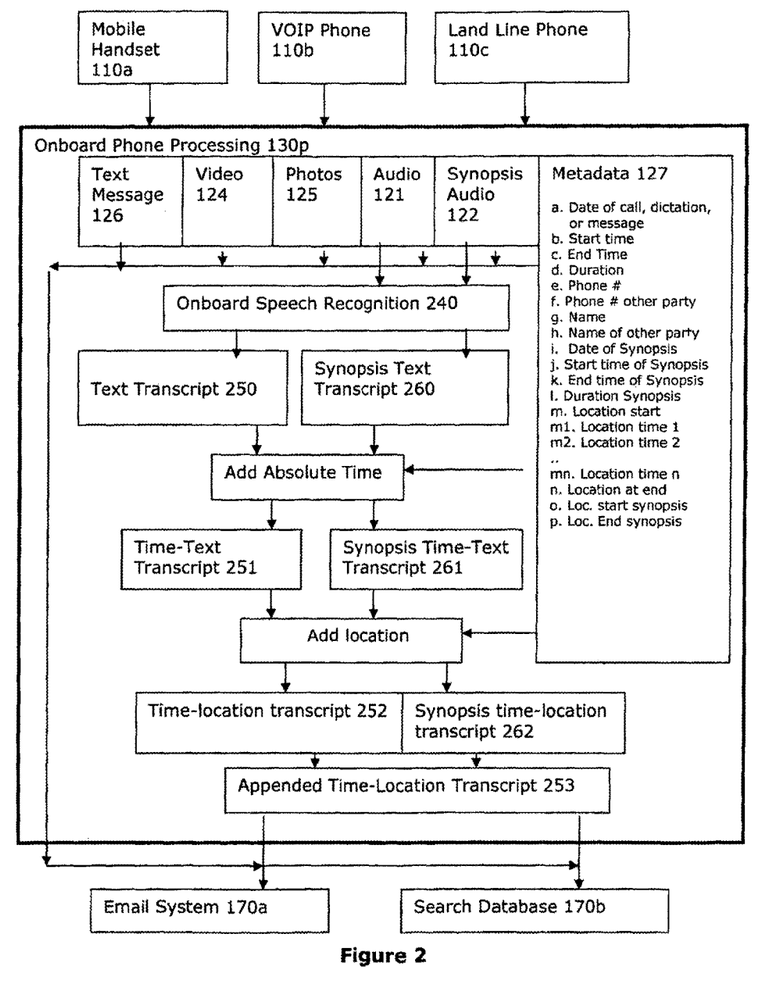
FIG. 2 illustrates a block diagram with speech recognition and intermediary processing onboard the Phone.

FIG. 2 illustrates the speech recognition may be performed on the Phone instead of the server, this phone-based speech recognition may be of lesser quality than server-based speech recognition due to many factors including the processing capability of the phone. The sequence of operation in FIG. 2 is approximately the same as in FIG. 1.

As shown in FIG. 2, on the Mobile Handset Phone 110a, Voice Over IP (VOIP) Phone 110b or land line phone 110C, the audio 121 and synopsis audio 122 are processed by an onboard speech recognition engine 240, to generate a text transcript 250 of the call or dictation audio and text transcript 260 of the synopsis audio.

The text transcript 250 and synopsis text transcript 260 can contain a timestamp indicating the time or byte offset within the audio 121 and synopsis audio 122 where each voice recognized-word is found.

The relative time or byte offset can be used to hear the audio of the word while viewing the text of the word. This could be used, e.g., to verify the accuracy of the voice-recognized text.

For applications where the actual time spoken for each word may be important, e.g., for video and audio surveillance, the start date and time of the call or dictation may be read from metadata 127.

The start date 127a and start time 127b may be added to the relative timestamp 250a for each word in text transcript 250 to produce time-text transcript 251 with an absolute date/timestamp for each word, so that you have a text word, a relative time offset, and an absolute date/time for each word.

The synopsis start date 127i and synopsis start time 127j may be added to the relative timestamp 260a for each word in the synopsis text transcript 260 to produce synopsis time-text transcript 261 with an absolute date/timestamp for each word, so that you have a text word, a relative time offset, and an absolute date/time for each word.

The user may configure the present invention to record or send new Location data any time the user's location changes by a certain distance, such as 2 meters.

The location coordinates 127m1, 127m2, ... 127mn read from metadata 127 can be added next to each word in the time-text transcript 251 to produce time-location transcript 252, so you have time-location stamps for each word, i.e., a record of where the phone user was when the phone user spoke each word.

The synopsis location coordinates 127n read from metadata 127 can be added next to each word in the synopsis time-text transcript 261 to produce synopsis time-location transcript 262, so you have time-location stamps for each word, i.e., a record of where the phone user was when the phone user spoke each word.

In order to simplify searching, there may be only one searchable text document for each call or dictation, the call time-location text transcript 252 may be appended to the end of the synopsis time-location text transcript 262 to produce the appended time-location transcript 253.

The call transcript timestamps have an indicator, such as a flag byte, that can be used to differentiate them from the synopsis timestamps, so when the user views the time-location text transcript 253 and clicks to hear the audio, the correct related audio can be accessed, i.e., either the call audio 121 or synopsis audio 122.

Time-location text transcript 252 and synopsis time-location transcript 262 may have the plain speech-recognized text first in the transcript, followed by the same speech-recognized text with the timestamps next to each word, so users who are viewing the text with their regular email viewer can read the text without seeing the timestamps.

The time stamped part of a transcript may be placed at the bottom of the text transcript, the time stamped part of the transcript may be sent as an attachment.

For calls and dictation, the appended time-location transcript 253, along with attached call audio 121, attached synopsis audio 122, attached video 124, attached photos 125, and metadata 127 recorded on or streamed live from Mobile Handset Phone 110a, Voice Over IP (VOIP) Phone 110b or land line phone 110C may be transmitted via the Internet or intranet, e.g., using TCP/IP for nearly lossless or at least high-quality data transmission, to the email system 170a or Search Database 170b of the user.

For text messages, the text message 126, along with the attached video 124, attached photos 125, and metadata 127 which may be recorded on or streamed live from Mobile Handset Phone 110a, Voice Over IP (VOIP) Phone 110b or land line phone 110C may be transmitted via the Internet or intranet, e.g., using TCP/IP for lossless or at least high-quality data transmission, to the email system 170a or Search Database 170b of the user.

Speech recognition may be speaker independent, in which a generic trained vocabulary is used for speech recognition, instead of a using a trained speech recognition in which each speaker trains the system for their own speech.

Speech recognition may be more accurate for speakers who have trained the system with samples of their own speech.

The speech recognition may be more accurate if a defined vocabulary is specified, such as legal and medical.

Figure 3:
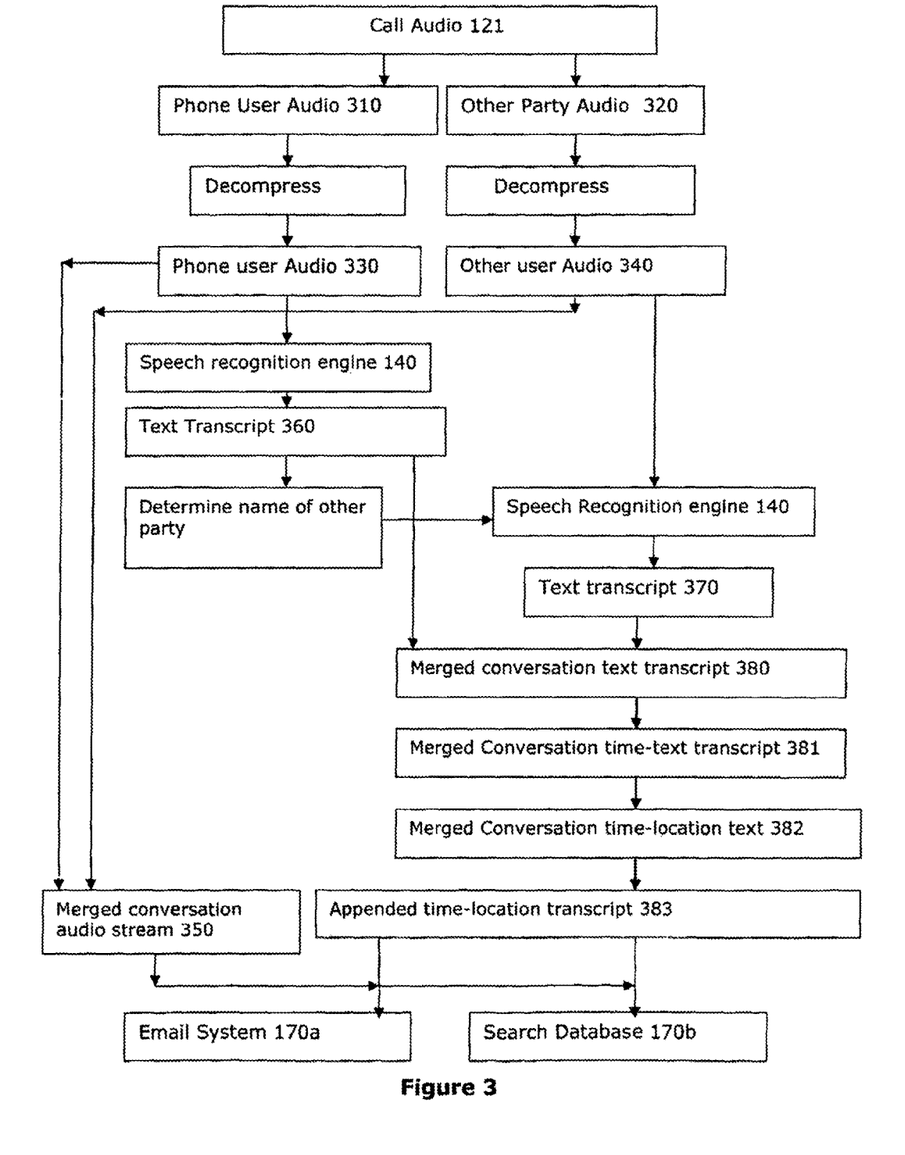
FIG. 3 illustrates using the caller ID, address book, and speech recognized text of the phone user, to determine the name of the other party, for speech recognition of the other party's speech.

Therefore, as shown in FIG. 3, the present invention provides for the identification of each speaker and the use of the speaker identification by the speech recognition engine to improve speech-recognition accuracy. The teaching shown in FIG. 3 can be used in conjunction with the teaching shown in FIGS. 1 and 2.

The call audio 121 may include the audio 310 of the phone user which may be picked up from a (preferably) noise canceling microphone on the Phone, and the audio 320 of the other party to the call. The audio 320 of the other party might be of lesser quality than the phone user's audio, e.g., because it is being transmitted over a voice channel that is not only lossy but limited as to high and low frequencies it transmits.

The voice phone channel can also be noisy, e.g., because of a bad phone connection, common for cell phones in certain locations.

The two speakers may be differentiated by a first and second audio streams 310 and 320, which may be are decompressed into the first and second audio streams 330 and 340, so the speech recognition engine can use the Speech Recognition training set for the first and second speaker in order to provide individual speech recognition for each speaker, to increase speech recognition accuracy.

Audio may be encoded at different sampling rates (i.e. samples per second—the most common being: 8 kHz, 16 kHz, 32 kHz, 44.1 kHz, 48 kHz and 96 kHz), and different bits per sample (the most common being: 8-bits, 16-bits or 32-bits).

Speech recognition engines may work best if the acoustic model they use was trained with speech audio which was recorded at the same sampling rate/bits per sample as the speech being recognized.

Therefore, the present invention may provide for voice-recognition training over the same device that will be used for recording the audio of the calls.

For voice recognition from mobile handsets, the present invention provides for training of the voice-recognition engine from the mobile handset, for land-line use the voice-recognition training would be from the land-line phone and for VOIP use, the voice recognition training would be from the VOIP phone.

If a user uses multiple devices, such as a mobile handset and a land-line phone, the voice-recognition training set for the mobile handset is used for mobile handset calls, and the voice recognition training set for the land-line phone is used for land-line calls, etc.

The limiting factor for telephony based speech recognition is the bandwidth at which speech can be transmitted. For example, a standard land-line telephone only has a bandwidth of 64 kbit/s at a sampling rate of 8 kHz and 8-bits per sample (8000 samples per second*8-bits per sample=64000 bit/s). Therefore, for telephony based speech recognition, one needs acoustic models trained with 8 kHz/8-bit speech audio files.

In the case of Voice over IP, the codec determines the sampling rate/bits per sample of speech transmission. If one uses a codec with a higher sampling rate/bits per sample for speech transmission (to improve the sound quality), then the acoustic model must be trained with audio data that matches that sampling rate/bits per sample.

Speech signals, i.e., signals intended to carry only human speech can usually be sampled at a much lower rate. For most phones, most of the energy may be within the 5 Hz-4 kHz range, allowing a sampling rate of 8 kHz. This is the sampling rate used by nearly all telephony systems, which use the g.711 sampling and quantization specifications.

The present invention can do speech recognition on both of the audio streams, i.e., the audio stream 330 of the phone user and the audio stream 340 of the other party.

To use the trained vocabulary for each speaker, the present invention should determine the identification of the speaker, and transmit the speaker identification to the speech recognition engine.

To determine the identification of the user, the caller ID and address book may be used in order to identify incoming calls, if caller ID is available. For outgoing calls, the address book may be used, since the phone user presumably knows who they are calling.

However, for incoming calls, the other party may call from multiple phone numbers over a period of time, thus the present invention stores the various phone numbers that the other party has called from or could call from.

Also, one phone number can be used by multiple different callers, such as roll over lines from a business, or just different people using the same phone number.

Thus, the phone number may be just one clue as to the identity of the other speaker.

The present invention may use the speech recognized text of the start of the call as a further clue. For example, someone may call and the phone user could say "hello" and the other party could say "Hello Jim, this is Bob Smith (or perhaps just Bob)", and the phone user could say "Hello Bob" or "Hello Bob Smith"

At the end of the conversation, the phone user may be prompted for the opportunity to speak a short synopsis.

If the speech recognition is being done in real time with the Phone, the present invention queries the phone user with "Was this Bob Smith or instead Bob Jones", if the phone user had said "Hello Bob", and Bob Smith and Bob Jones were the only two Bob's trained for voice recognition.

Once a caller is first identified to the system, a voice print of the caller's first few words of the call, such as 'Hello Jim' are saved, and this voice print can be used to help identify the caller, the next time that he calls.

The speech recognition engine 140 reads the audio and produces text transcript 360. The text includes, for each word, a timestamp with the time spoken, relative to the start of the audio, and a confidence level, for an assumed accuracy of each word.

The phone-user's text transcript 360 is examined for clues as to the identity of the other party (such as Hello Bob Smith), and this is used with other clues, such as the address book and phone number of the other party, to identify the other party so that a previously trained vocabulary for the other party can be used in speaker-dependent speech recognition, to produce other party text transcript 370.

After speech recognition, the text transcript 360 of the phone user and the text transcription 370 of the other party is merged, using the timestamps for each word to synchronize the text, into one Merged Conversation text transcript 380. The Merged Conversation text transcript 380 shows the full text of the conversation, and shows who is speaking, for each change in speaker.

Digital audio is a sequence of numbers, e.g., 8,000 8 bit bytes per sample, with each byte encoding the amplitude of the audio. The frequency of the audio may not be explicitly encoded in these numbers; alternatively, the frequency may be encoded instead in the sequence and periodicity of these number (i.e., the variation in the amplitude (y axis) over time (x axis)

Therefore, the decompressed audio stream 330 for the phone user and the decompressed audio stream 340 for the other party can be combined into one Merged Conversation Audio Stream 350, containing both speaker's voice, by adding the numbers and normalizing for volume and normalizing for the different sampling rates used by each speaker's audio stream.

The time duration of the Merged Conversation Audio Stream 350 may be the greater of the durations of audio streams 330 and 340.

The ability to hear the spoken word may be important because speech recognition is not 100% correct, and if a user sees gibberish in the text, the user can alternatively hear the actual audio.

The present invention may store the "confidence level of correctness" provided by the speech recognition engine with each word in the speech-recognized text transcript.

The present invention uses this confidence level to indicate to the user they may be reading lower confidence recognized words, and the user may want to click the actual text words to hear the audio of that word and the surrounding words.

The indication of the confidence level may be displayed, e.g., by putting the text in different colors, using yellow for medium-level-of-confidence words, and red for low-level-of-confidence words, with the levels being user configurable.

The call start date 127*a* and call start time 127*b* may be added to the relative timestamp 380*a* for each word in Merged Conversation Text Transcript 380 to produce Merged Conversation Time-Text transcript 381 with an absolute date/timestamp for each word, so that you have a text word, a relative time offset, and an absolute date/time for each word.

The call location coordinates 127*m*1, 127*m*2, . . . 127*mn* read from metadata 127 may be added next to each word in the Merged Conversation Time-Text transcript 381 to produce the Merged Conversation Time-Location Text 382, to provide for the user time-location stamps for each word, i.e., to provide a record of not just where, in the audio file, each word can be found, but where the phone user was when the phone user spoke each word.

In order to simplify searching, so that there is only one searchable text document for each call or dictation, the Merged Conversation Time-location Text 382 is appended to the end of the synopsis time-location text transcript 162 to produce the appended time-location transcript 383.

The appended time-location transcript 383, merged conversation audio stream 350, synopsis audio 122, video 124, photos 125, and metadata 127 may be transmitted from the computer server 130 or onboard phone processor 130*p* via the Internet or intranet to the email system 170*a* or Search Database 170*b* of the user.

Each appended time-location transcript 383 may be one email or one document, and the user can use the search facilities provided by their email system or the Search Database to search and view the appended time-location transcript 383, and click to hear the merged conversation audio stream 350.

Figure 4:
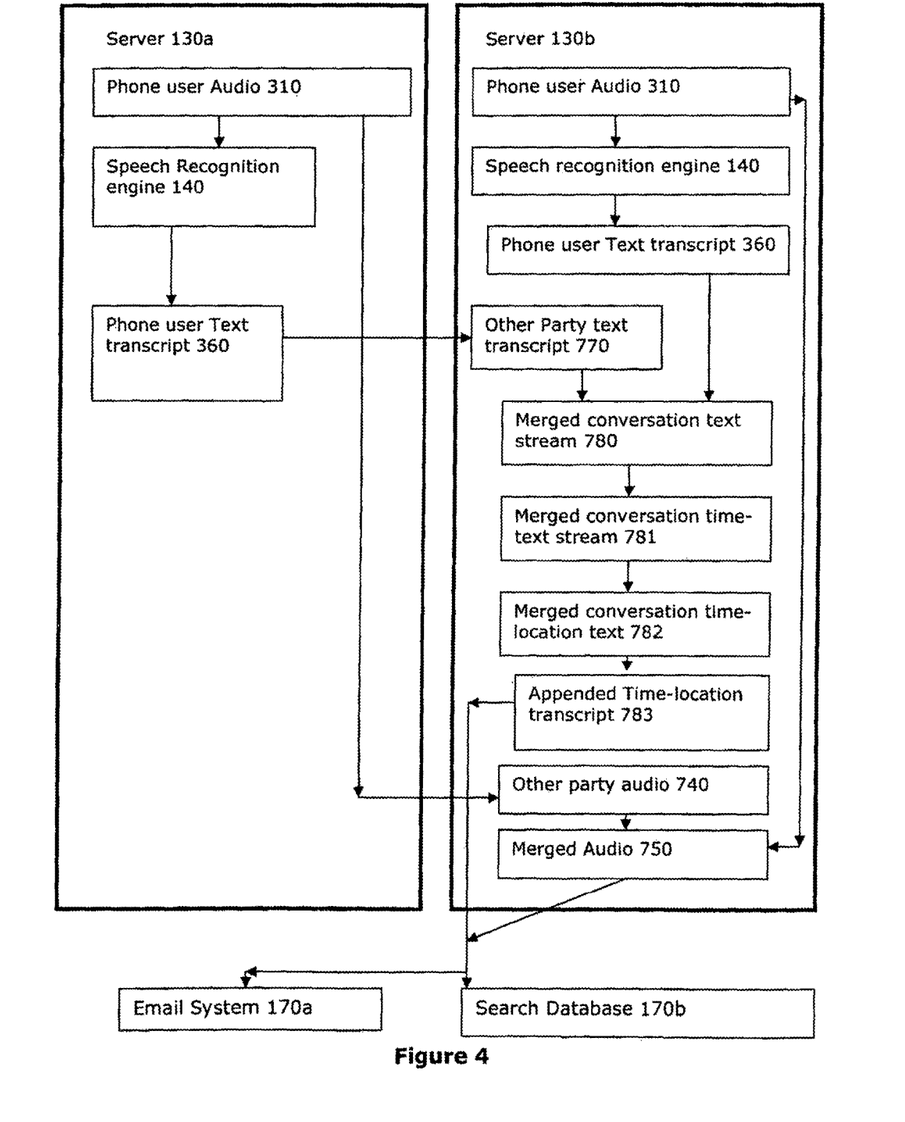
FIG. 4 illustrates sharing of speech-recognized text and optionally audio between both (or multiple) parties to the call, to increase the accuracy of speech-recognized text for both (or all) parties to the call.

As shown in FIG. 4, if both parties to the call are using the present invention, and both parties agree to share phone call data, the present invention may send each user's speech recognized text transcript, and optionally audio as well, to the other user.

For example, if Siena Lewis is talking with Bob Smith, and Sierra Lewis does not have Bob Smith trained in her speech recognition engine and Bob Smith does not have Sierra Lewis trained in his speech recognition, then Siena Lewis should have a more accurate text transcript of her words than Bob has, and vice-versa.

This is because Sierra Lewis has trained her speech recognition for her speech, and also because her speech is recorded from the microphone, instead of from a lower quality voice channel over, e.g., a cell phone connection.

Thus, assuming both users are using the present invention, the more accurate text transcript 360 is transmitted from the server 130*a* of the first user to the server 130*b* of the second user (it could be the same server or a different server), producing other party text transcript 770. The better quality compressed audio 310 can also be sent to the server of the first user, and uncompressed into audio 740 of the second user.

On the server 130*b* of the second user, the more accurate other party text transcript 770 is merged with the text transcript 360, using the timestamps for each word to synchronize the text, and the merged conversation text stream text 780 is generated.

Also, the higher-quality audio 740 of the second user can be merged with the audio 310 of the first user, to produce merged audio 750.

In order to simplify searching, so that there is only one searchable text document for each call or dictation, the Merged Conversation Time-location Text Transcript 782 is appended to the end of the synopsis time-location text transcript 162 to produce the appended time-location transcript 783.

The appended time-location transcript 783, Merged Audio 750, synopsis audio 122, video 124, photos 125, and metadata 127 may be sent to the email system 170a or Search Database 170b of the user, and the user can search this information.

The less accurate version of the conversation could be automatically deleted from the email system or Search Database of the phone user.

Since the confidence level for the speech is calculated by the speech recognition engine, an average confidence level for the entire text of each users side of the conversation can be used to determine which party has the most accurate version of the text, and thus which party should send the text to the other party.

This could be used instead of assuming that each phone user has the most accurate recognized text of their side of the call.

Audio-visual speech recognition is a technique that uses image processing capabilities and lip reading to aid speech recognition.

Taking advantage of the phone video capabilities, the video of the speaker's face (during the conversation) can be sent from the phone and used by the speech recognition engine for lip reading to give better speech recognition results.

Figure 5:
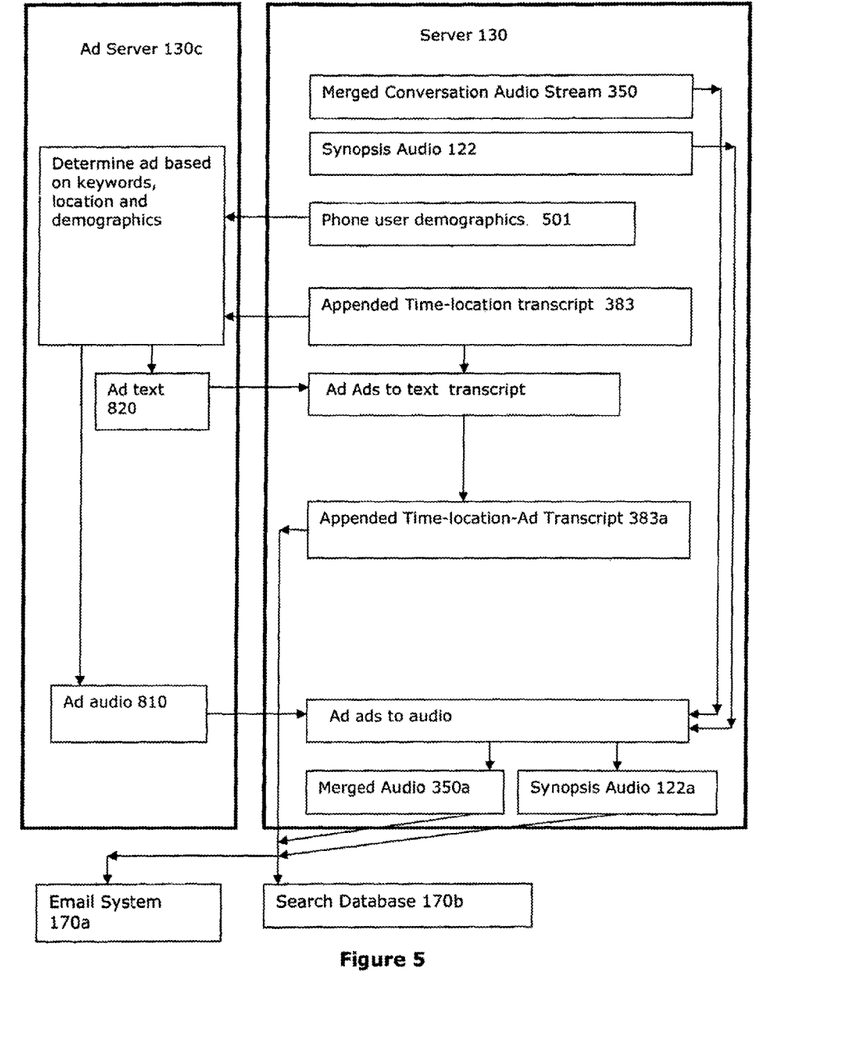
FIG. 5 illustrates an advertising supported version of product.

As shown in FIG. 5, for users desiring an ad-supported service, instead of a subscription-based service, the present invention may provide for targeted ads. The present invention may use the speech-recognized text, to target the ad to something (a keyword) mentioned one or more times in the conversation.

Also, the present invention may use the user-provided (or phone company provided) demographics of the Phone user to target the ad, including age, sex, income, job title, interests, etc.

The location of the phone user may also be used to target the ad.

Since the location coordinates may be added to the timestamp in the text transcripts, the text transcripts may have a record of where the user was when the user spoke each word.

This location-spoken data may be used, e.g., in the selection of ads to present to the user. If the phone user is discussing a 100 inch Panasonic flat panel TV, the presented ad may be an ad for the store nearest the user, at the time the user mentioned the 100 inch Panasonic TV.

On the server 130, the appended time-location transcript 383 is sent to an Ad Server 130c where the most appropriate ad is determined, based on keywords, the location of the phone user when each keyword was spoken, and the demographics 501 of the phone user. The ads are then "presented" to the user.

The ads can be "presented" by prefixing the ad audio 810 to the merged conversation audio stream audio 350, generating the Merged audio 350a and prefixing the ad audio 810 to the synopsis audio 122, giving Synopsis audio 122a.

The ad text 820 may contain relative offsets of the position where each word is in the related ad audio 810.

The ad may also be "presented" by prefixing the ad text 820 to the appended time-location transcript 383, and adding the time duration of Ad audio 810 to the relative-time timestamps in the appended time-location transcript 383, so each text word will still have the correct relative time offset to the same word in the audio. This may provide an appended time-location-ad transcript 383a.

Similarly, if the speech recognition is done on the phone instead of a server, the appended text transcript 253 may be searched for ad keywords. If one or more keywords are found, ads relevant to these keywords may be "presented" to the user.

Also, the user may be able to see the ad text on their phone or hear the ad audio before they are allowed to record their call synopsis.

The appended time-location-ad transcript 383, Merged Audio 350a, synopsis audio 122a, video 124, photos 125, and metadata 127 are sent to the email system 170a or Search Database 170B of the user, and the user can search this information.

The present invention provides for a user-specified configuration, such that the user may select which, if any, of the following are to be sent to the user's email system or Search Database, including Call audio of just the first user's side of the conversation, Call audio of just the second user's side of the conversation, Call audio of both the first user and a second user's sides of the conversation, call audio of synopsis, call metadata (such as phone number and time of call), voice recognized text of each side of conversation, voice recognized text of synopsis, photos, video, text messages, etc.

Figure 6:
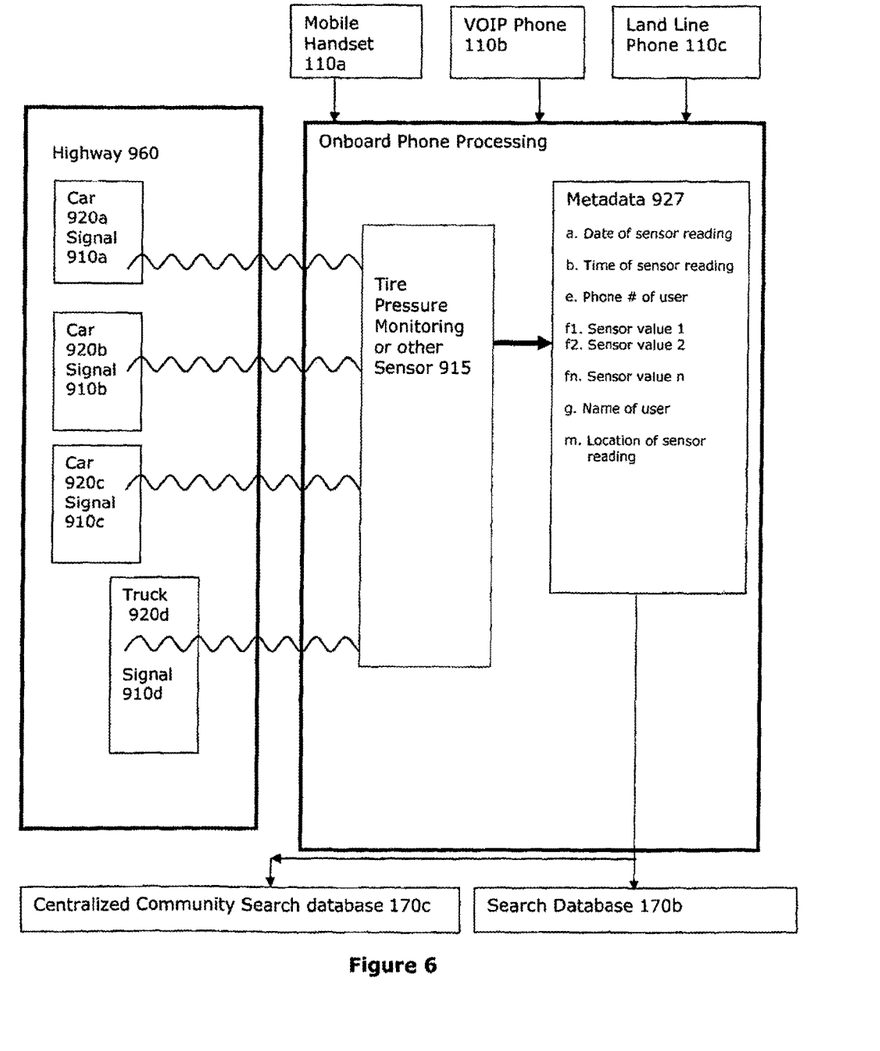
FIG. 6 illustrates the use of a multiple mobile Phones for rolling surveillance by detecting tire pressure monitoring signals of adjacent vehicles.

As shown in FIG. 6, the data sent from the Phone to a searchable repository may also include data picked up by using the Phone as a sensor, e.g., to record and transmit wireless data from another Phone or an adjacent automobile. This could be useful for rolling ad-hoc surveillance of vehicles or people.

For example, all new vehicles are mandated to have a tire pressure monitoring system (TPMS), in which each tire periodically sends a wireless signal to the vehicle to which the tires are mounted.

To differentiate between its own wheels and wheels of the vehicle in the next lane, each TPMS sensor may include a unique id, for each vehicle. The majority of TPMS sensors may transmit information in clear text using the assigned approximate and by example radio frequencies 315 MHz or 433 MHz.

The Phone, if equipped with the appropriate sensor 915, may automatically record the TPMS unique vehicle ID 910 from passing vehicles 920, and send this data, with the metadata location 927m and date of sensor reading 927a and time of sensor reading 927b to the Search Database 170b or Centralized Community Search database 170c.

The Centralized Community Search database may be one maintained by a central service, such as the government, so the central service could map the locations where all "detected" vehicles were at any time they were detected.

The phone sensor may also detect and record Bluetooth signals from adjacent vehicles or phones, or "drive by wireless" signals in vehicles.

If a sufficient number of people in a community used their Phone to record and transmit TMPS data from passing cars, this may be useful for a rolling ad-hoc surveillance of vehicles or people.

In addition to TMPS data, Phone users may chose to transmit their text messages, photos, videos, call and voice annotations or synopsis (with speech-recognized text and location data), to a Centralized Community Search database.

The default operation for the phone for the present invention may be for the recorded speech and other content to be labeled private, so only the Phone user can access it, but the Phone user may designate certain of the content to be public, to be shared with anyone via the Internet, in what we call Location Blogging.

This could also be called a community or collective photographic memory, where the content is contributed by multiple members of the community.

For example, if there is a traffic jam, or a hazard in the road, such as a stalled vehicle, or a driver driving the wrong way on the Interstate, the Phone user can send a voice message with speech-recognized text, and location data for each word, to a Centralized Community Search database. This could also include a photo or video attachment.

The Location Blog could be a review of a restaurant or business.

The Location Blogs may be positioned on a spatial platform, such as Google Maps. An Internet user may zoom into any part of this map, and browse content originating from any region.

The Centralized Community Search database of Location Blogs (with speech-recognized text and location data) may be searched or mined based on social network or type of information, such as "Urgent Road Warnings" when driving or "Best Menu Choice" at a restaurant location.

The Centralized Community Search database may show all Location Blogs for the Phone user's current location, and may be ranked by any one or combination of ranking factors, such as distance from the Phone user's current location and the location of the original Location Blog poster, such as 10 feet, 100 feet, 1,000 feet, 10,000 feet, etc.

Other search ranking factors, used alone or in combination may include reverse chronological order, social network credibility or social network popularity of the Location Blog poster, and type of data (e.g., Urgent Road Warning versus restaurant ratings).

Ranking the Location Blogs by the credibility of the poster may be one way to lessen the impact of spam or inaccurate postings or warnings. Another way is the approach taken by Wikipedia, where anyone can post but anyone else can delete a post, i.e., everyone is a system moderator.

Also, certain people could be appointed as moderators, based on their social network credibility. Or, for hazard warnings, the moderators could be public safety first responders in the community.

Referencing FIG. 2, for calls and dictation, the appended time-location transcript 253, along with attached call audio 121, attached synopsis audio 122, attached video 124, attached photos 125, and metadata 127 which may be recorded on or streamed live from Mobile Handset Phone 110a, Voice Over IP (VOIP) Phone 110b or land line phone 110C may be transmitted via the Internet or intranet, e.g., using TCP/IP for nearly lossless or at least high-quality data transmission, to the Centralized Community Search database, FIG. 6, 170c.

Referencing FIG. 2, for text messages, the text message 126, along with the attached video 124, attached photos 125, and metadata 127 which may be recorded on or streamed live from Mobile Handset Phone 110a, Voice Over IP (VOIP) Phone 110b or land line phone 110C may be transmitted via the Internet or intranet, e.g., using TCP/IP for lossless or at least high-quality data transmission, to the Centralized Community Search database, FIG. 6, 170c.

The Location Blogs could be used with onboard speech recognition (FIG. 2) or with server based speech recognition (FIG. 1).

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

What is claimed is:

1. A computer implemented system for presenting social network provided outputs to a mobile electronic device dependent on a location, in response to the mobile electronic device user's input, comprising:
 a hardware data input port configured to receive information from the mobile electronic device user defining the user input;
 an automated hardware processor configured to define a user request dependent on the user input and metadata associated with the received information from the mobile electronic device user, comprising at least the location of the mobile electronic device determined by an automated hardware geospatial positioning system;
 an automated hardware communication interface port configured to:
  automatically transmit the user request to a social network database comprising a plurality of roadway condition records having time information and location information associated with respective roadway conditions;
  automatically receive location-dependent social network information from the social network database, selectively dependent on the transmitted user request; and
  communicate a message dependent on the received location-dependent social network information for creating a new record in the social network database, comprising time information and location information of a respective roadway condition;
 an automated hardware user interface configured to selectively present the received social network information ranked according to at least one social network ranking factor.

2. The computer implemented system according to claim 1, wherein the received information comprises human speech, further comprising a speech to text converter, wherein the defined user input comprises a transcript of at least a portion of the human speech.

3. The computer implemented system according to claim 1, wherein the mobile electronic device comprises a cell phone.

4. The computer implemented system according to claim 1, wherein the automated hardware communication interface port is configured to communicate voice over internet protocol communications to a remote automated server.

5. The computer implemented system according to claim 1, further comprising a speech recognition engine to translate speech into searchable words within the mobile electronic device.

6. The computer implemented system according to claim 1, wherein the social network database comprises a database of restaurant ratings.

7. The computer implemented system according to claim 1, wherein the social network database comprises a database of road conditions.

8. The computer implemented system according to claim 1, wherein the social network database comprises a database of posting records created by posters, wherein the posters each have at least one of an associated credibility and an associated popularity, and the at least one social network ranking factor is dependent on the at least of the poster credibility and the poster popularity associated with respective posting record presented through the automated user interface.

9. The computer implemented system according to claim 1, wherein the social network database comprises a database of business ratings, and the at least one social network ranking factor is dependent on at least the business rating associated with respective posting record presented through the automated user interface.

10. The computer implemented system according to claim 1, wherein the received social network information is ranked according to a combination of ranking factors comprising a proximity of a location associated with a respective record and the location of the mobile electronic device.

11. The computer implemented system according to claim 1, wherein the location of the mobile electronic device is determined by at least one of an automated geospatial positioning system and an automated cell phone tower triangulation system.

12. The computer implemented system according to claim 1, wherein the automated hardware user interface comprises a geographic map.

13. The computer implemented system according to claim 1, wherein the hardware data input port is configured to receive image information.

14. The computer implemented system according to claim 1, further comprising a memory configured to persistently store and retrieve a plurality of user inputs.

15. The computer implemented system according to claim 1, wherein the automated hardware user interface is configured to present at least one location-dependent advertisement to the mobile electronic device user in dependence on at least the location.

16. A computer implemented method for presenting social network-provided outputs to a mobile electronic device dependent on a location, in response to the mobile electronic device user's input, comprising:
receiving information from the mobile electronic device user defining the user input through a hardware data input port;
automatically determining a location of the mobile electronic device by an automated hardware geospatial positioning system;
automatically defining a user request dependent on the user input and metadata associated with the received information from the mobile electronic device user with at least one automated hardware processor, comprising at least the automatically determined location of the mobile electronic device;
automatically transmitting the user request to an automated social network database comprising a plurality of records having location information, comprising a database of roadway condition records comprising a time and location associated with roadway conditions;
automatically receiving location-dependent social network information from the social network database through a hardware interface, selectively dependent on the transmitted user request; and
automatically communicating a message dependent on the received location-dependent social network information for creating a new record in the social network database comprising a time and location of a respective roadway condition;
automatically ranking the received social network information according to at least one social network ranking factor with at least one automated processor; and
presenting the ranked received social network information through an automated hardware user machine interface.

17. The method according to claim 16, wherein:
the mobile electronic device comprises a cell phone; and
the received social network information is ranked according to a combination of ranking factors comprising a proximity of a location associated with a respective record and the location of the mobile electronic device.

18. A computer implemented system, comprising:
a hardware data input port configured to receive information from a human user of a wireless mobile electronic device defining a user input;
an automated system for determining a location of the mobile electronic device; and
at least one automated processor, configured to:
automatically define at least one new social network database record dependent on the user input, associated with at least a location, a time, and a rating of a roadway condition;
automatically transmit the at least one new social network database record through a wireless communication network to an Internet connected social network database comprising a plurality of roadway condition records, each comprising a time and a location of an associated roadway condition;
automatically define at least one social network database query dependent on the user input and the determined location of the wireless mobile electronic device;
automatically receive social network database location-based records, selectively dependent on the transmitted social network database query dependent on the user input and the location; and
automatically present the received social network database location-based records ranked according to at least one social network ranking factor through an automated hardware user interface system of the mobile electronic device.

* * * * *